United States Patent [19]

Asquith et al.

[11] Patent Number: 5,442,907
[45] Date of Patent: Aug. 22, 1995

[54] BOOTSTRAP RE-IGNITION SYSTEM FOR AIRCRAFT JET ENGINE

[75] Inventors: Joseph G. Asquith, Calabasas; William P. Peschel, Venice; Jacob L. Sperling, Carlsbad, all of Calif.

[73] Assignee: Aero-Plasma, Inc., Calabasas, Calif.

[21] Appl. No.: 222,012

[22] Filed: Apr. 4, 1994

[51] Int. Cl.⁶ .............................. F02C 7/26; F02G 3/00
[52] U.S. Cl. .............................. 60/39.06; 60/39.091; 60/39.141; 60/39.821
[58] Field of Search ............ 60/39.06, 39.091, 39.141, 60/39.821, 39.826, 39.827; 315/111.21

[56] References Cited

U.S. PATENT DOCUMENTS

| | | | |
|---|---|---|---|
| 2,589,971 | 3/1952 | Skarstrom | 60/39.091 |
| 3,600,887 | 8/1971 | Gault | 60/39.141 |
| 3,747,340 | 7/1973 | Fenton et al. | 60/39.281 |
| 3,765,176 | 10/1973 | Nelson et al. | 60/223 |
| 3,805,517 | 4/1974 | Sewell et al. | 60/39.091 |
| 3,830,055 | 8/1974 | Erlund | 60/39.091 |
| 4,783,957 | 11/1988 | Harris | 60/39.281 |
| 4,597,259 | 7/1986 | Moore et al. | 60/39.091 |
| 5,129,221 | 7/1992 | Walker et al. | 60/39.141 |
| 5,170,621 | 12/1992 | Barnum et al. | 60/39.091 |
| 5,257,500 | 11/1993 | Venkataramani et al. | 60/39.827 |

Primary Examiner—Richard A. Berisch
Assistant Examiner—Howard R. Richman
Attorney, Agent, or Firm—Saul Epstein

[57] ABSTRACT

A system for re-igniting an aircraft gas turbine jet engine which has flamed out, using a plurality of electromagnetic wave powered plasma plume igniters in an intermittent mode to avoid compressor stall, and bootstrap the engine back up to normal operating conditions. The system uses electromagnetic wave powered plasma plume igniters to provide a source of thermal energy to ignite fuel, and the Fully Automatic Digital Engine Control (FADEC) which is a standard component on aircraft using aircraft gas turbine jet engines, to control the igniter operation preventing compressor stall during the re-ignition process.

12 Claims, 3 Drawing Sheets

BOOTSTRAP RE-IGNITION SYSTEM FOR AIRCRAFT JET ENGINE

BACKGROUND OF THE INVENTION

A critical consideration in the design of turbojet or turbofan engines for modern aircraft is providing for the need to recover from a variety of engine flameout incidents, including high-altitude incidents relating to compressor stall, temporary fuel system malfunctions (pump power shutdown), and emergency responses to incidents such as engine fire warnings, as well as many lower altitude conditions relating to weather such as excessive water or ice ingestion, etc. Obviously, safety considerations for both commercial and military aircraft requires the ability to recover from these incidents with the least risk to the aircraft, the passengers, and the crew.

Fortunately, current aircraft experiencing incidents of these types have an excellent record of recovery. However, even though successful, the recoveries often involve rapid descents and highly disturbing losses of altitude, situations that are obviously very undesirable. Rapid descents may be intentionally performed after a flameout in order to maintain an adequate engine inlet pressure so as to avoid compressor stall when re-ignition is attempted. Even under favorable conditions, the capability for high altitude re-ignition of a modern turbojet engine that has undergone compressor rotational slowdown using a high energy spark igniter (as is commonly used) is limited to about 10,000 feet altitude with engine inlet Mach numbers below 0.3, and to slightly above 25,000 feet with the aircraft performing a controlled high-speed descent to increase the engine inlet pressure. These are most significant performance disadvantages with important safety implications.

It is therefore an object of the present invention to provide a system which will control the high altitude re-ignition process of an aircraft gas turbine jet engine which has flamed out in such a manner as to avoid compressor stall while reestablishing normal combustor operating conditions.

SUMMARY OF THE INVENTION

When fuel combustion on an engine in a high altitude inflight aircraft is terminated without physical damage to the engine, i.e., when the engine has "flamed out" the speed of the compressor drops rapidly, and a very short period of time is available (a matter of seconds) for reapplication of startup fuel quantities and normal ignition spark, else the compressor may stall before normal operating conditions are reestablished. After this short period of time, successful high altitude re-ignition can be achieved only if the aircraft is put into a descent to raise the inlet pressure high enough to avoid compressor stall during restart.

The present invention avoids the necessity for rapid descents by providing means to modulate both the thermal energy applied in the combustor chamber and the amount of fuel supplied during the restart period so that the compressor speed can be "bootstrapped" up to its normal speed without suffering compressor stall. This is accomplished through the use of high frequency electromagnetic wave powered plasma plume igniters, in conjunction with the Fully Automatic Digital Engine Control (FADEC) which is a standard component on modern jet aircraft. The invented system provides a large and controlled amount of thermal energy to the combustor of an engine which has suffered flameout so as to controllably increase compressor turbine speed and reestablish normal operating conditions without stalling. At the same time, the necessity for engaging in rapid descents or otherwise subjecting the passengers and crew to uncomfortable and possibly dangerous conditions is avoided.

The igniters used in the present invention are capable of producing a relatively large amount of thermal energy in the form of a continuous plasma plume. The presently preferred igniters are powered by high frequency electromagnetic waves (microwaves) obtained from individual magnetrons, with the energy coupled to the igniters via waveguides. The igniters include a receiving antenna within the waveguide to receive the energy, and a coaxial transmission line for coupling the received energy through the engine casing where the igniter terminates in a gap, across which the plasma discharge is formed. Air, at a higher pressure than exists in the combustor chamber, preferably obtained from the annular space between the combustor wall and the engine casing, is used to blow the plasma into a plume, which plume extends substantially into the combustor chamber.

Such an igniter is capable of delivering a greater amount of continuous or extended duration thermal energy to the air/fuel mixture in a jet engine than can the high energy, necessarily intermittent, surface discharge spark igniters which are currently used in modern gas turbine jet engines. Since the igniters used are self-starting, the amount of thermal energy delivered can easily be controlled by merely switching the electrical energy supplied to the igniter off and on as required.

During the re-ignition process, engine parameters are continuously monitored, and the igniter energy is carefully controlled in such a way as to bring combustion chamber conditions up to normal, while not allowing compressor stall. This process completely eliminates the urgent need to accomplish a restart before the compressor turbine slows down.

DETAILED DESCRIPTION OF THE INVENTION

Figure 1:
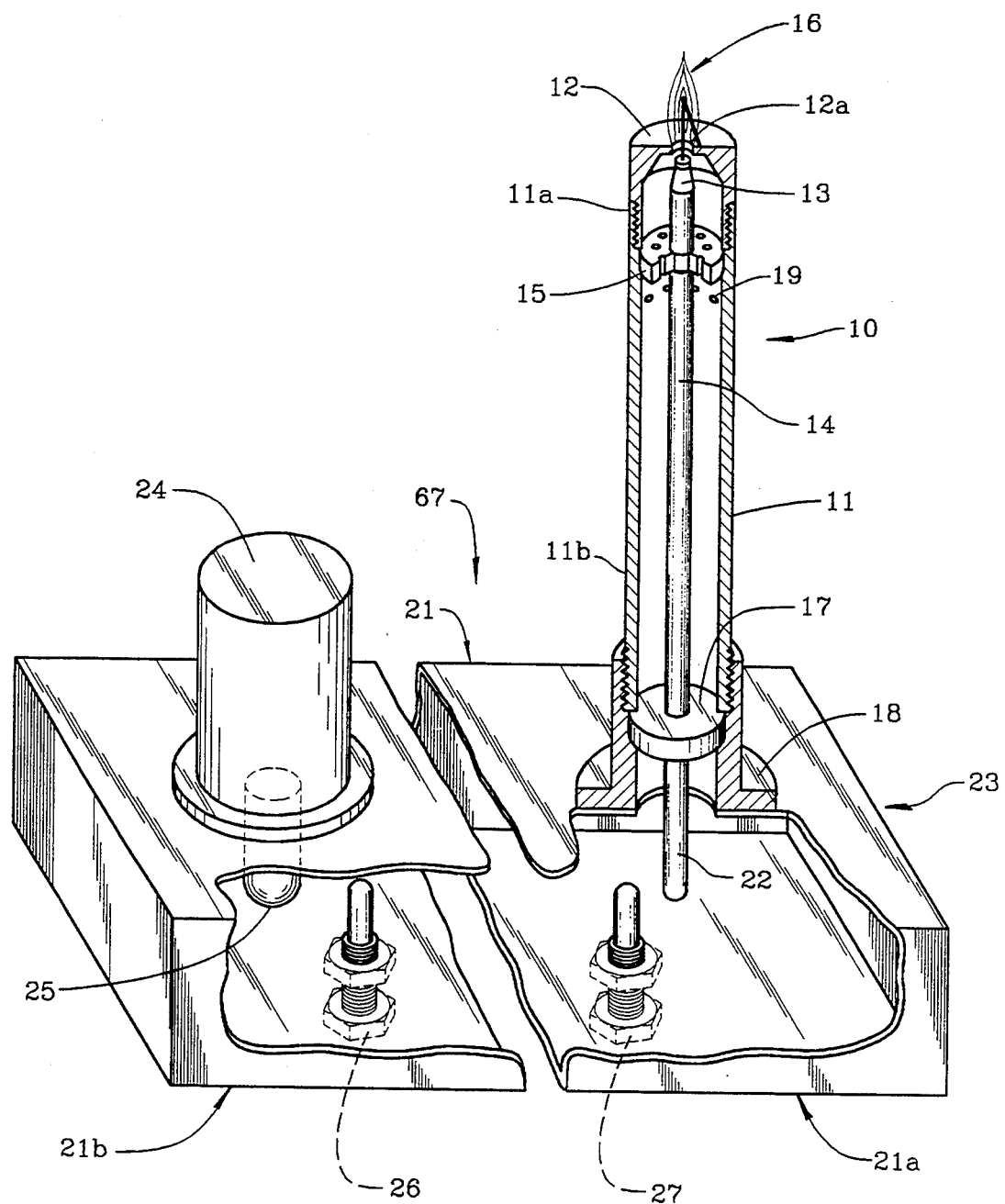
FIG. 1 is a perspective view of an igniter assembly, including the igniter itself, a magnetron power source, and a waveguide coupler for coupling energy from the magnetron to the igniter. The components shown are partly sectioned to show the interiors.

The presently preferred high frequency, electromagnetic wave powered, plasma plume igniter used in connection with the invention is illustrated in FIG. 1, which is a perspective view of an igniter assembly 67, with cut away sections at selected regions of the igniter 10, the waveguide transmission line 21, and the magnetron 24.

Electromagnetic energy which is eventually transformed into thermal energy by the igniter is provided by a magnetron 24 (or other high frequency electromagnetic energy generating device) which is joined to the waveguide 21 at wave launcher section 21b. Energy is radiated from the magnetron by antenna 25, and flows down the waveguide toward the igniter located near the other end of the waveguide at section 21a. The stubs 26 and 27 located in sections 21b and 21a respectively provide adjustment to establish maximum energy coupling over the anticipated operating conditions, as is well known in the art. Once the stub positions are defined they are fixed in position. The total waveguide length is not critical, and can be any length which is convenient for the particular installation.

The igniter 10 is joined to the waveguide by an attachment fitting 18, and is located near the end of the waveguide opposite the magnetron, at section 21a. The major portion of the length of the igniter is a coaxial transmission line, the outer boundary of which is a tubular metal outer conductor 11 that acts both as the coaxial waveguide's outer electromagnetic wave boundary and radiation confinement barrier, and as the principal structural member of the igniter. The overall length and shape of the igniter 10 can be substantially varied to permit integration into various jet engine combuster configurations. A most efficient length of the igniter to result in greatest energy transfer can be determined by experimentation. The length of the igniter can then be varied from that most efficient length by half wavelength increments, still maintaining the efficiency of energy transfer.

The outer conductor 11 is preferably manufactured from electrically conductive metals, and it, as well as all of the interior components in close proximity to the engine combuster region interface, must be capable of withstanding temperatures in excess of 600 degrees Celsius. The outer conductor cap 12 (which is threaded into the end of outer conductor 11), and the center conductor tip 13 comprise the plasma plume forming means. The igniter is made self-starting by causing a concentrated energy field to exist between the conductor tip 13 and cap 12 before the plasma is created. This is accomplished by locating the top surface of tip 13 even with, or slightly below the interior corner of hole 12a. There are then a pair of opposed corners between which the field exists before formation of the plasma, causing the field to be concentrated.

The plasma plume 16, as illustrated in FIG. 1, is initially formed as a self induced spark between the opposed corners of tip 13 and hole 12a, but after formation (because of air flow through the igniter which will be discussed below) it immediately fans out to form the plume 16. Tip 13 and cap 12 should be fabricated from metal alloys exhibiting relatively high thermal conductivity, preferably at least four to five times that of austenitic stainless steels, to assist in removing the deposited electron-ion energy and to facilitate cooling by the internal flowing air.

The center conductor 14 of the igniter means is centered by a dielectric spacer 15. The dielectric spacer 15 is held against a shoulder on the interior of the outer conductor 11 by the outer conductor cap 12. This attachment maintains the axial position of the dielectric spacer 15. The axial position of the center conductor 14 is held by locking the center conductor to the dielectric spacer 15 between a shoulder in the center conductor 14 and a shoulder developed by threading the center conductor tip electrode 13 into the center conductor 14. The radial spacing between the center conductor 14 and the interior surface of the outer conductor 11 is established by the dielectric spacer 15 along with the dielectric spacer 17 located at the igniter power input end 11b. The dielectric spacer 17 is designed to allow the inner conductor to slide to accommodate thermal expansion, but the spacer is locked to the outer conducter by a shoulder within the igniter-waveguide attachment fitting 18.

A series of holes 19 in the outer conductor 11 are provided to allow air from outside the combustor liner, which is always at a higher pressure than the interior of the engine combustor, to be injected into the interior of the igniter 10. The air is confined by the outer conductor 11 and the dielectric spacer 17, but can flow through holes in the dielectric spacer 15 and out into the combustor through the annular orifice formed by the center conductor tip electrode 13 and the hole 12a in the outer conductor cap electrode 12. Air flowing through this annular orifice causes the plasma to form a plume (as shown at numeral 16 of FIG. 1). The air also provides cooling for the igniter components. The velocity of the air, controlled primarily by the applied pressure, the size of holes 19, and the annular orifice, is set based on the environment of the turbojet engine combustor region in which the igniter means is developing the plasma plume. Ordinarily, a few to several tens of cubic feet per hour will be found appropriate.

High frequency electromagnetic energy is coupled from the waveguide 21 to the igniter via the igniter radiation receiver antenna 22 which is attached to the igniter center conductor 14 at the igniter power input end 11b. The antenna 22 should be fabricated from a metal with good electrical and thermal conductivity. Preferably, antenna 22 is simply an extension of the inner conductor 14. The position of the antenna centerline with respect to the waveguide end wall 23 in the igniter coupling section 21a is important and can be readily defined for the specific chosen operating electromagnetic wave frequency by someone well versed in the art.

Magnetron 24, powered by a power supply which is not shown, provides the electromagnetic energy to form the plasma. The magnetron antenna 25 radiates the electromagnetic energy from the magnetron into wave launcher section 21b of the waveguide. The electromagnetic energy is transmitted along the waveguide transmission line toward the igniter antenna 22, where it is received and is further transmitted along the high frequency coaxial transmission line that couples the energy received at the antenna 22 to the active plasma plume forming end 11a of the igniter. As previously noted, the center conductor tip 13 and the outer conductor cap 12, which comprise the plasma plume forming means, develop a locally concentrated field strength when electromagnetic energy is developed in the system. The concentration of field strength causes a plasma discharge to occur between the center conductor tip and the end surface and portions of the interior surface of the outer conductor cap. This results in the formation of an external large plasma plume extended by the magnitude of the forced-air flow, as indicated by numeral 16 in FIG. 1.

Figure 2:
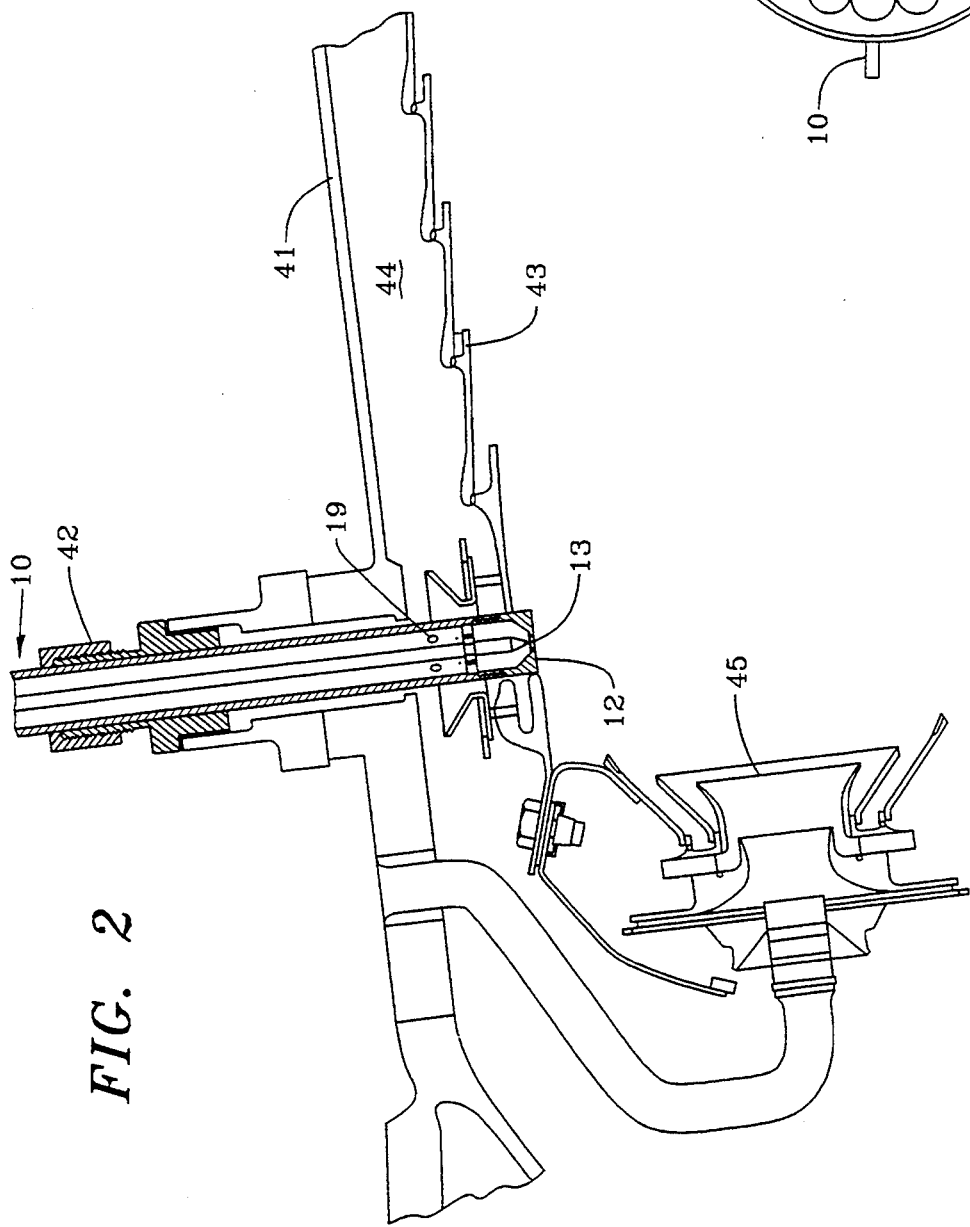
FIG. 2 is a sectioned view of a portion of the combustor chamber of a gas turbine jet engine, showing how an igniter is installed.

A typical igniter installation in the combustor section of a jet engine is shown in FIG. 2. As shown, the igniter 10 passes through an opening in the wall of the engine casing 41, and is held in place by a compression type of fitting 42, with the face of cap 12 being approximately flush with the interior of the combustor liner 43. Holes 19 are seen to be in a position to receive air from the region 44 between the engine casing and the combustor lining. Air in this region is at a higher pressure than that in the combustor interior so that, in operation, there is always a flow of air to extend the plasma plume into the combustor. The plasma plume provides thermal energy to ignite fuel which is being supplied to the combustor from the fuel cup 45.

Figure 3:
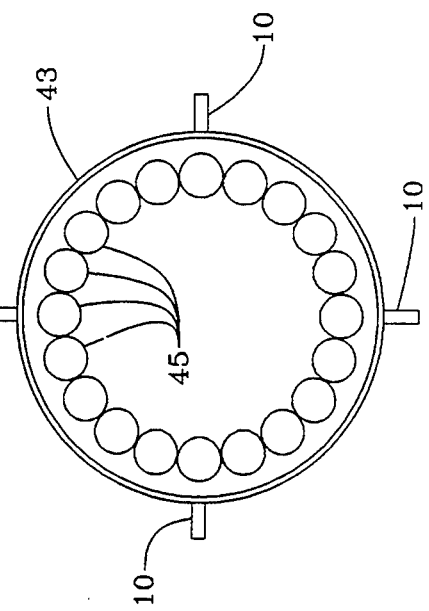
FIG. 3 is a diagrammatic rear view of a combustor chamber, showing how several igniters might be spaced in a typical gas turbine jet engine.

Two or more igniters are spaced around the circumference of the engine depending on the design of the particular engine involved. These igniters form the source of thermal energy used to controllably reestablish normal operating conditions within the combustor of a jet engine which has suffered a flameout. As depicted in FIG. 3, four igniters 10 are shown installed in an engine with twenty fuel cups 45. Commercial engine combustor test data has indicated that four igniters, as shown, will indeed support a rapid, very high altitude, bootstrap re-ignition for a twenty cup combustor (a common commercial size).

Figure 4:
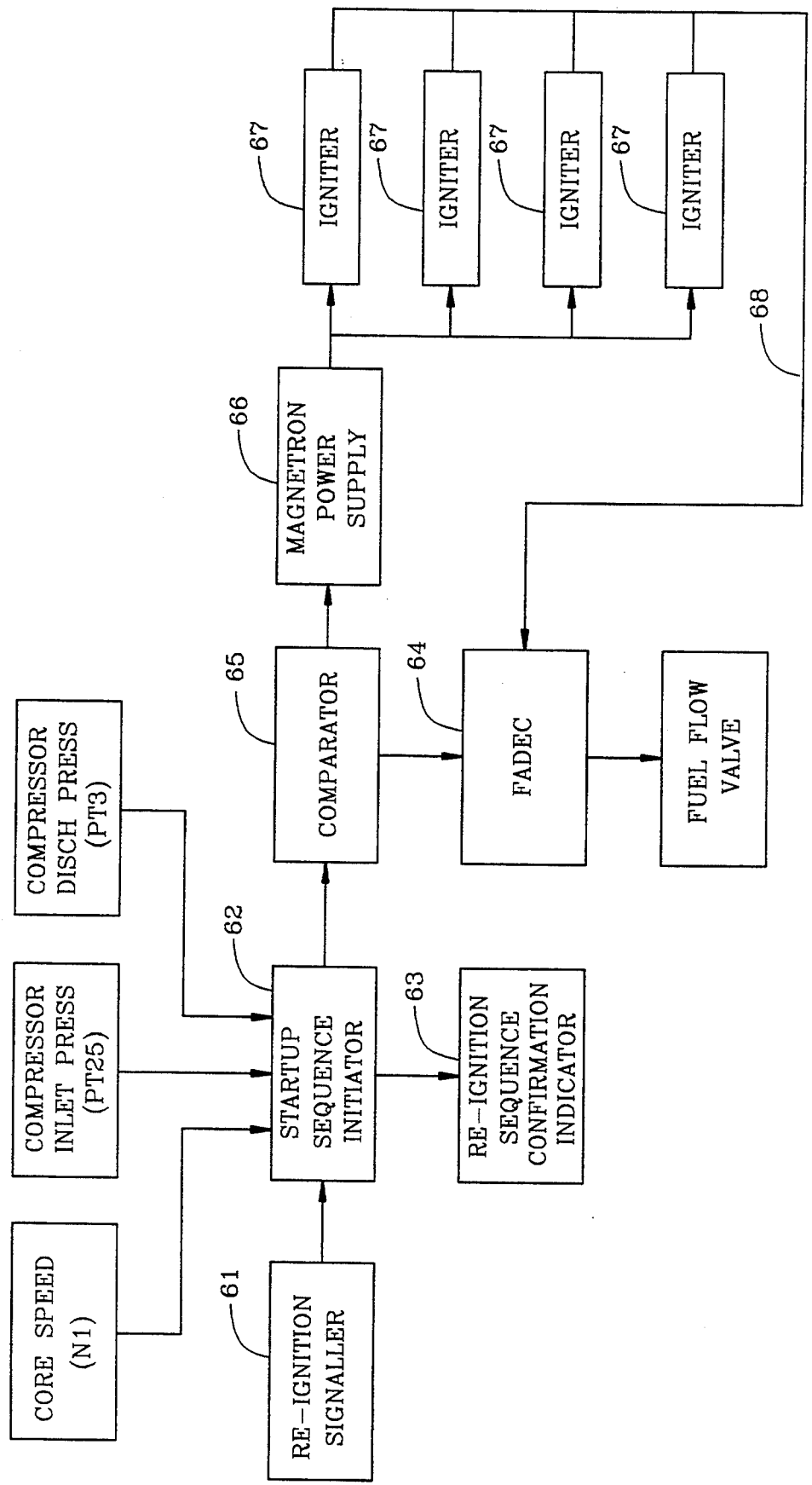
FIG. 4 is a block diagram of the control system for the invented bootstrap re-ignition system.

The control system used to establish re-ignition is depicted in the block diagram of FIG. 4. The data used to control re-ignition are obtained from sensors monitoring engine performance, and from predetermined engine characteristics. Many operating variables of modern commercial jet engines are continuously monitored during flight, either or both for control or for informational purposes. The present invention utilizes the outputs of several existing sensors to provide the information needed to control the thermal power input to the combustor while normal operating conditions are being reestablished. In particular, compressor speed, N1, (called core speed), compressor inlet pressure, PT25, and compressor discharge pressure, PT3, are used. Also utilized, is the Fully Automatic Digital Engine Control (FADEC) that is employed on all modern commercial jet aircraft engines. It should be understood, however, that while these existing components are preferably used, a dedicated control system and/or dedicated sensors could also be used.

The capability to perform a rapid, very high altitude, bootstrap re-ignition of an aircraft turbojet or turbofan engine is made practical and possible by the ability of the high frequency electromagnetic wave powered plasma plume igniter to develop a very high temperature continuous or intermittent plasma plume ignition kernel that sustains combustion (while the plasma plume remains active) even though combustor pressure conditions are too low to support self-sustaining combustion propagation. Such conditions typically occur at very high flight altitudes after an accidental jet engine flameout has occurred. Combustion occurs not only at the combustion cup where an igniter is installed, but also at adjacent fueled combustion cups.

The re-ignition system logic controls the engine start up by activating and deactivating the plasma plume igniter in a controlled manner, thus limiting the pressure ratio developed across the high pressure compressor to values that will not cause compressor stall. When the plasma plume is deactivated, the fuel flow is interrupted or set-back by a signal to the FADEC. Fuel interruption is done both for operational safety reasons, and to eliminate the chance for self propagating combustion which might occur at the lower altitude end of the re-ignition cycle. This further assures that the pressure ratio across the compressor does not exceed the stall pressure ratio limit during the re-ignition sequence.

The bootstrap re-ignition sequence begins with a command initiated by the aircraft pilot (or automatically, if desired), given by activating a manual or automatic cockpit re-ignition signaller 61, which in turn activates the start-up sequence initiator 62. If the core speed, N1, obtained from the core speed sensor, is above a predetermined minimum rotational value, the sequence is initiated, and an indicator 63 in the cockpit confirms initiation. If the core speed has dropped to a value which is too low to safely initiate re-ignition, the sequence is not initiated, and indicator 63 will reflect that condition. If the sequence does not start, the pilot can influence the values of N1 by adjusting the attitude and/or the descent rate of the aircraft, and then reactivate the cockpit signaller 61. If conditions are appropriate at the time the signaller 61 is energized, the startup sequence initiator 62 sends a continuing signal activating the compressor stall pressure ratio comparator 65. The comparator includes a read only memory (ROM) chip in which is stored the compressor's characteristic stall pressure ratio limit data versus N1. The compressor pressure values PT3 and PT25 are obtained from the respective sensors, and are fed to the comparator 65, which calculates the pressure ratio and compares it to the limiting stall pressure ratio for the actual core speed N1. As long as the monitored value of PT3/PT25 remains below the stall value developed by the comparator 65, a signal is sent by the comparator to the magnetron power supply 66, causing power to be continually applied to the igniter systems 67 to maintain plasma plumes in all of the respective plasma plume igniters.

When the plasma plumes are developed, a confirmation signal is generated and sent to the FADEC along line 68. This signal authorizes the FADEC 64 to deliver fuel at the appropriate re-ignition rate (for the specific existing combustor/turbocompressor conditions) to each of the combustor regions. If the resulting plasma plume causes the value of PT3/PT25 to reach stall conditions, the signal from the comparator 65 to the magnetron power supply 66 is interrupted, terminating the power to the igniter systems and thus turning off the plasma plumes and interrupting the confirmation signal from the igniter systems to the FADEC. The FADEC then stops or sets-back fuel flow. At such time as the value of PT3/PT25 falls to a level adequately below stall, as determined by the comparator 65, the signal to the magnetron power supply 66 is reinstated and the re-ignition sequence continues.

The speed of the compressor is increased incrementally during each activation of the igniters until conditions in the combustor become such as to permit continuous operation, as determined by core speed, or possibly by the compressor discharge pressure. At this time, a signal is sent to the FADEC returning full control of the engine to the FADEC.

What has been invented is a control system for re-igniting an aircraft gas turbine jet engine which has flamed out, possibly at very high altitude, without the necessity for engaging in rapid descents to avoid compressor stall during the re-ignition process. Various adaptations and variations of the invention as disclosed herein will no doubt occur to those skilled in the art, which adaptations and variations are intended to be covered by the following claims.

We claim:

1. A method for re-igniting an aircraft gas turbine jet engine which has suffered flameout which comprises the steps of:

providing a plurality of igniters in the combustor chamber of said jet engine;

determining the maximum ratio of discharge pressure to inlet pressure for the compressor of said engine which will be permitted to exist for various core speeds of said compressor;

sensing the core speed of said compressor;

sensing the actual discharge and inlet pressures of said compressor and calculating their ratio;

comparing the actual ratio of discharge pressure to inlet pressure of said compressor to said maximum ratio for the core speed then obtaining; and controlling the power to said igniters such that when the ratio of said actual discharge and inlet pressures of said compressor is less than said maximum value for the core speed then obtaining, said igniters will be powered, and when the ratio of said actual discharge and inlet pressures of said compressor is more than said maximum value for the core speed then obtaining, said igniters will not be powered.

2. The method as recited in claim 1 wherein said igniters are microwave powered plasma plume igniters.

3. A system for re-igniting an aircraft gas turbine jet engine which has suffered flameout which comprises:

a plurality of continuous firing igniters disposed around the periphery of the combustor of said jet engine whereby thermal energy can be provided within said combustor continuously for extended periods;

one or more power supplies for providing power to said igniters; and control means responsive to the core speed of the compressor of said jet engine and the ratio of discharge pressure to inlet pressure of said compressor for switching the power to said igniters on and off during the re-ignition period.

4. A system for re-igniting an aircraft gas turbine jet engine which has suffered flameout as recited in claim 3, where said control means also controls the flow of fuel to said combustor.

5. A system for re-igniting an aircraft gas turbine jet engine which has suffered flameout as recited in claim 3, and where said control means includes means for comparing the actual ratio of discharge pressure to inlet pressure of said compressor with the ratio of discharge pressure to inlet pressure of said compressor which would result in stall of said compressor, and said control means controls the power to said igniters to prevent stall from occurring.

6. A system for re-igniting an aircraft gas turbine jet engine which has suffered flameout as recited in claim 3, where said control means includes means for comparing the actual ratio of discharge pressure to inlet pressure of said compressor with the ratio of discharge pressure to inlet pressure of said compressor which would result in stall of said compressor, and for deactivating said igniters if said actual ratio of discharge pressure to inlet pressure of said compressor becomes higher than said ratio of discharge pressure to inlet pressure of said compressor which would result in stall of said compressor.

7. A system for re-igniting an aircraft gas turbine jet engine which has suffered flameout as recited in claim 3 and further including means responsive to core speed for preventing said igniters from being activated if said core speed is below a predetermined value.

8. A system for re-igniting an aircraft gas turbine jet engine which has suffered flameout which comprises:

a plurality of microwave powered plasma plume igniters disposed around the periphery of the combustor of said jet engine whereby plasma plumes can be established within said combustor;

one or more microwave power supplies for providing power to said igniters; and control means responsive to the core speed of the compressor of said jet engine and the ratio of discharge pressure to inlet pressure of said compressor for switching the power to said igniters on and off during re-ignition.

9. A system for re-igniting an aircraft gas turbine jet engine which has suffered flameout as recited in claim 8, where said control means also controls the flow of fuel to said combustor.

10. A system for re-igniting an aircraft gas turbine jet engine which has suffered flameout as recited in claim 8, and where said control means includes means for comparing the actual ratio of discharge pressure to inlet pressure of said compressor with the ratio of discharge pressure to inlet pressure of said compressor which would result in stall of said compressor, and said control means controls the power to said igniters to prevent stall from occurring.

11. A system for re-igniting an aircraft gas turbine jet engine which has suffered flameout as recited in claim 8, where said control means includes means for comparing the actual ratio of discharge pressure to inlet pressure of said compressor with the ratio of discharge pressure to inlet pressure of said compressor which would result in stall of said compressor, and for deactivating said igniters if said actual ratio of discharge pressure to inlet pressure of said compressor becomes higher than said ratio of discharge pressure to inlet pressure of said compressor which would result in stall of said compressor.

12. A system for re-igniting an aircraft gas turbine jet engine which has suffered flameout as recited in claim 8 and further including means responsive to core speed for preventing said igniters from being activated if said core speed is below a predetermined value.

* * * * *